(12) United States Patent
Chang et al.

(10) Patent No.: US 11,570,381 B2
(45) Date of Patent: Jan. 31, 2023

(54) METHOD AND APPARATUS OF ADAPTIVE INFRARED PROJECTION CONTROL

(71) Applicant: MediaTek Inc., Hsinchu (TW)

(72) Inventors: Te-Hao Chang, Hsinchu (TW);
Chi-Hui Wang, Hsinchu (TW);
Chi-Cheng Ju, Hsinchu (TW);
Ying-Jui Chen, Hsinchu (TW);
Chun-Nan Li, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/384,963

(22) Filed: Jul. 26, 2021

(65) Prior Publication Data

US 2021/0352227 A1    Nov. 11, 2021

Related U.S. Application Data

(62) Division of application No. 16/354,552, filed on Mar. 15, 2019, now abandoned.

(60) Provisional application No. 62/651,815, filed on Apr. 3, 2018.

(51) Int. Cl.
| | |
|---|---|
| *H04N 5/33* | (2006.01) |
| *H04N 5/225* | (2006.01) |
| *H04N 5/232* | (2006.01) |
| *G06T 7/50* | (2017.01) |
| *G06V 10/25* | (2022.01) |
| *G06V 40/19* | (2022.01) |
| *G06V 40/16* | (2022.01) |

(52) U.S. Cl.
CPC .................. *H04N 5/33* (2013.01); *G06T 7/50* (2017.01); *G06V 10/25* (2022.01); *G06V 40/168* (2022.01); *G06V 40/19* (2022.01); *H04N 5/2256* (2013.01); *H04N 5/23229* (2013.01)

(58) Field of Classification Search
CPC .... H04N 5/33; H04N 5/2256; H04N 5/23229; H04N 5/2258; H04N 5/23219; H04N 5/2354; H04N 13/239; H04N 13/243; H04N 13/254; H04N 13/271; H04N 13/296; H04N 9/3141; H04N 9/3155; G06T 7/50; G06V 10/25; G06V 40/168; G06V 40/19; G06V 10/141; G06V 40/161
See application file for complete search history.

(56) References Cited

U.S. PATENT DOCUMENTS

| | | | | |
|---|---|---|---|---|
| 7,695,138 | B2* | 4/2010 | Ng | G03B 17/00 |
| | | | | 351/221 |
| 10,321,055 | B2* | 6/2019 | Edwards | G06V 40/19 |
| 10,740,605 | B2* | 8/2020 | Zhou | G06V 40/16 |
| 10,776,623 | B2* | 9/2020 | Zhou | G06T 7/521 |
| 11,068,712 | B2* | 7/2021 | Gousev | H04N 5/23218 |
| 2008/0277601 | A1* | 11/2008 | Phinney | G06V 10/141 |
| | | | | 382/117 |
| 2016/0275348 | A1* | 9/2016 | Slaby | G06V 40/19 |
| 2016/0283789 | A1* | 9/2016 | Slaby | G06V 10/143 |
| 2017/0061210 | A1* | 3/2017 | Ollila | H04N 5/2256 |

(Continued)

*Primary Examiner* — Boubacar Abdou Tchoussou
(74) *Attorney, Agent, or Firm* — Han IP PLLC; Andy M. Han (57) ABSTRACT

A processor or control circuit of an apparatus receives data of an image based on sensing by one or more image sensors. The processor or control circuit also detects a region of interest (ROI) in the image. The processor or control circuit then adaptively controls a light projector with respect to projecting light toward the ROI.

6 Claims, 4 Drawing Sheets

(56) References Cited

U.S. PATENT DOCUMENTS

2018/0189547 A1\* 7/2018 Daniels .................. G06V 40/16
2019/0279398 A1\* 9/2019 Bai ...................... H04N 5/2354

\* cited by examiner

METHOD AND APPARATUS OF ADAPTIVE INFRARED PROJECTION CONTROL

CROSS REFERENCE TO RELATED PATENT APPLICATION(S)

The present disclosure is part of a divisional of U.S. patent application Ser. No. 16/354,552, filed 15 Mar. 2019, which claims the priority benefit of U.S. Patent Application No. 62/651,815, filed 3 Apr. 2018. Contents of aforementioned applications are incorporated by reference in their entirety.

TECHNICAL FIELD

The present disclosure is generally related to computer vision and, more particularly, to adaptive infrared (IR) projection control for depth estimation in computer vision.

BACKGROUND

Unless otherwise indicated herein, approaches described in this section are not prior art to the claims listed below and are not admitted as prior art by inclusion in this section.

Depth estimation in computer vision utilizes images of a given scene captured by two cameras to triangulate and estimate distances. Typically, depth estimation can be achieved with either passive stereo vision or active stereo vision.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, solutions, concepts, designs, methods and apparatuses that enable adaptive IR projection control. It is believed that reduction in power consumption and IR projection time, as well as improved eye safety, may be achieved by implementing various proposed schemes in accordance with the present disclosure.

In one aspect, a method may involve receiving data of an image based on sensing by one or more image sensors. The method may also involve detecting a region of interest (ROI) in the image. The method may further involve adaptively controlling a light projector with respect to projecting light toward the ROI.

In one aspect, an apparatus may include a processor or control circuit which, during operation, may perform operations including: (a) receiving data of an image based on sensing by one or more image sensors; (b) detecting a region of interest (ROI) in the image; and (c) adaptively controlling a light projector with respect to projecting light toward the ROI.

It is noteworthy that, although description provided herein may be in the context of certain EM wave spectra and light-emitting topologies such as IR, the proposed concepts, schemes and any variation(s)/derivative(s) thereof may be implemented in, for and by other EM wave spectra and/or light-emitting technologies such as, for example and without limitation, light-emitting diode (LED), laser, light detection and ranging (LiDAR) and time-of-flight (TOF). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
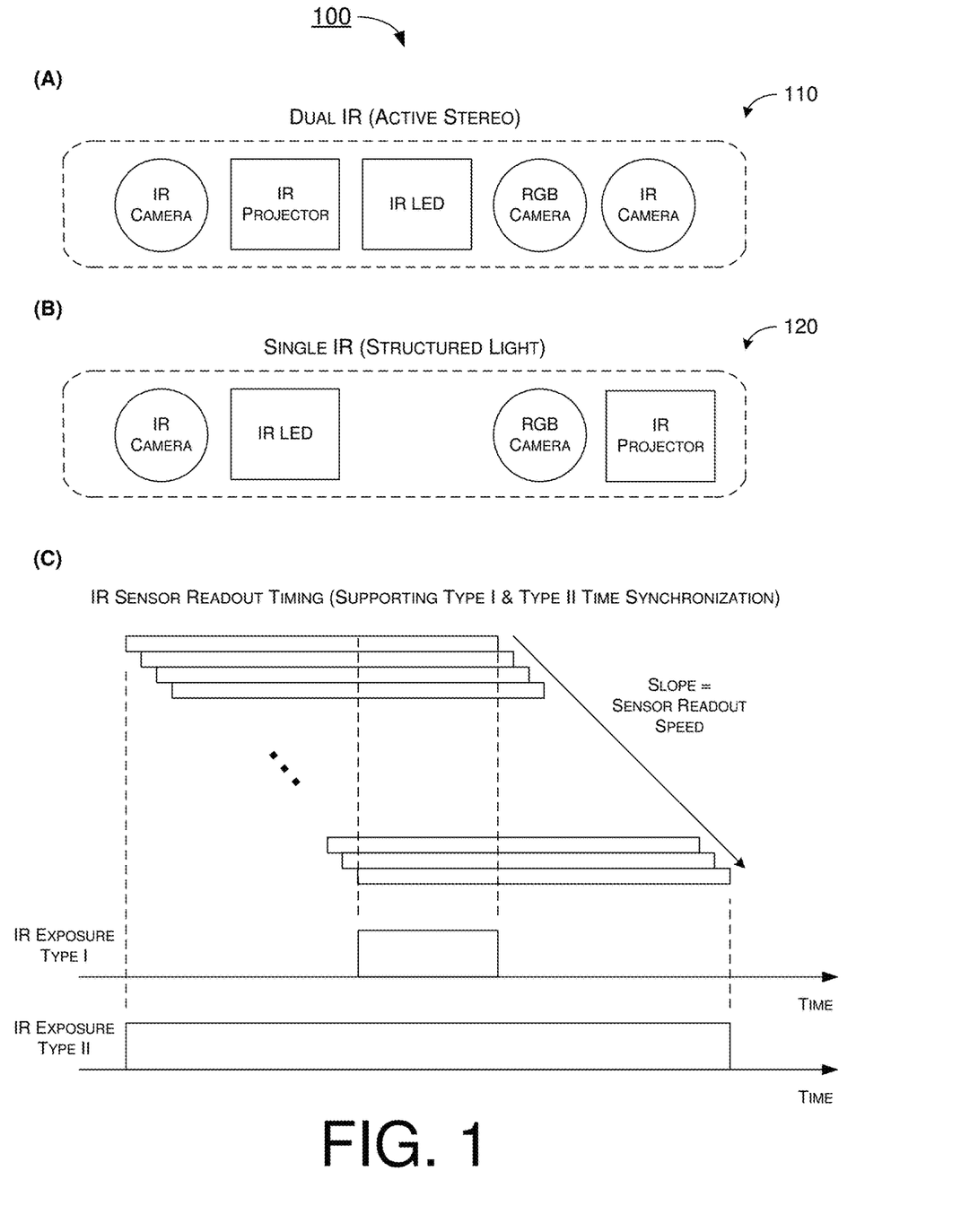
FIG. 1 is a diagram of an example scenario of IR projection for depth estimation.

For passive stereo vision, an IR projected projects a structured IR light toward a scene and a single IR camera is utilized to capture an image of the scene. For active stereo vision, two IR cameras are utilized to capture images of the scene. FIG. 1 illustrates an example scenario 100 of IR projection for depth estimation. Part (A) of FIG. 1 shows an example module 110 of an apparatus (e.g., smartphone) that may be utilized for active stereo vision. Module 110 may include two IR cameras, one red-green-blue (RGB) camera, one IR projector and one IR LED. During operation of module 110, the IR LED may emit IR light as floodlight to illuminate a scene, the IR projector may project a structured IR light toward the scene, each of the two IR cameras may capture a respective IR image of the scene, and the RGB camera may capture an RGB image of the scene. Part (B) of FIG. 1 shows an example module 120 of an apparatus (e.g., smartphone) that may be utilized for passive stereo vision. During operation of module 120, the IR LED may emit IR light as floodlight to illuminate a scene, the IR projector may project a structured IR light toward the scene, the single IR camera may capture an IR image of the scene, and the RGB camera may capture an RGB image of the scene.

Part (C) of FIG. 1 shows an example of IR sensor readout timing (e.g., with respect to the IR cameras of module 110 and module 120). As shown in FIG. 1, typically a rolling-shutter camera (e.g., an IR camera and/or a RGB camera in module 100/200) reads out an image in a row-by-row fashion in such a way that, a certain time after the readout of a given row has begun, the readout of a next row begins. Each of module 110 and module 120 may support either or both of type I and type II of IR exposure. Under type I, the IR projector in module 100/200 may be enabled, activated or otherwise turned on for a period of time which is the duration during which there is an overlap among the readout times of all the rows of a given image (e.g., IR image, RGB image or depth map). Under type II, the IR projector in module 100/200 may be enabled, activated or otherwise turned on for a period of time which is the duration from the beginning of the readout of the first row of a plurality of rows of the given image to the end of the readout of the last row of the plurality of rows.

Under a proposed scheme in accordance with the present disclosure, the IR projector may be adaptively controlled based on one or more conditions. That is, the IR projector may be adaptively enabled and disabled, or the power of the IR projector may be adaptively adjusted (e.g., reduced), according to whether at least one condition of one or more predefined conditions is met. Advantageously, compared to conventional approaches for type I and type II of IR exposure, the adaptively-controlled IP projection may result in reduction in power consumption and IR projection time as well as improved eye safety.

Figure 2:
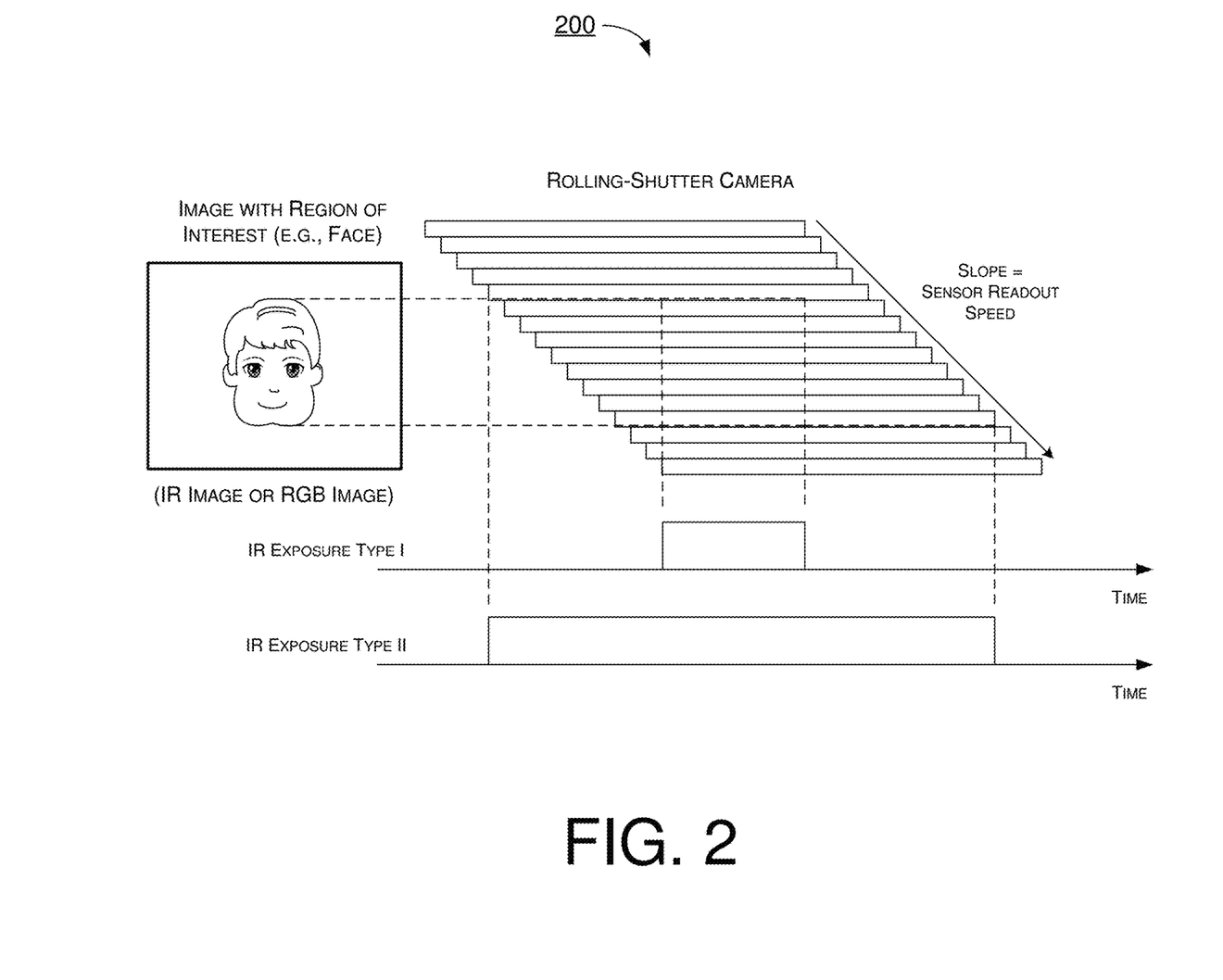
FIG. 2 is a diagram of an example scenario in accordance with an implementation of the present disclosure.

FIG. 2 illustrates an example scenario 200 of adaptive IR projection control in accordance with an implementation of the present disclosure. In scenario 200, an image (e.g., IR image, RGB image or depth map) having a region of interest (ROI) may be read out as described above. Moreover, under the proposed scheme, an IR projector may be adaptively controlled according to whether at least one condition of one or more predefined conditions is met. As a result, the amount of time the IR projector is turned on to project a structured IR light and/or an amount of power used by the IR projector in projecting the structured IR light may be reduced.

For illustrative purposes and without limiting the scope of the present disclosure, the face of a person may be a ROI in an image since facial recognition-related applications (e.g., three-dimensional (3D) face unlock, 3D face payment, 3D emoji, and so on) are gaining popularity in terms of usage. Accordingly, under the proposed scheme, timing and/or power of IR projection by an IR projector in active stereo vision and/or passive stereo vision may be adaptively controlled based on facial recognition or any ROI region in an image, which may be an IR image, RGB image or depth map. For instance, a face region in the image may be detected (e.g., by a control circuit or processor executing a facial detection/recognition algorithm) in an IR image, RGB image or depth map. Then, regardless of type I or type II of IR exposure, an amount of power used in projecting an IR light and/or an amount of time during which the IR light is projected may be reduced, thereby achieving reduction in power/time as well as improvement in eye safety.

Under the proposed scheme, the timing and/or power in IR projection by an IR projector (e.g., the IR projector in module 100 and/or module 200) may be adaptively controlled in one or more of a variety of ways. Description of some examples of adaptive control of IR projection is provided below.

In one example, a face (or another ROI) in an image may be used as a condition in adaptively controlling IR projection. Specifically, the IR projector may be enabled to project an IR light toward a face of a user (or another ROI in an image) during a first portion of a sensor readout time when one or more image sensors (e.g., IR camera and/or RGB camera of module 100/200) read(s) a portion of the image where the face/ROI is located. Moreover, the IR projector may be disabled to cease projecting the IR light toward the face during a second portion of the sensor readout time when the one or more image sensors read(s) another portion of the image where the ROI is not located. Accordingly, this may result in power saving. Furthermore, an eye region in an image may be used as a condition in adaptively controlling IR projection. Specifically, during the first portion of the sensor readout time, the IR projector may also be disabled to cease projecting the IR light when the one or more sensors read(s) a portion of the image where an eye/both eyes of the face is/are located so as to improve eye safety.

In one example, eye action(s) of the user may be used as a condition in adaptively controlling IR projection. Specifically, the IR projector may be enabled to project an IR light toward the face in response to eye(s) of the face being blinked or otherwise closed. Moreover, the IR projector may also be disabled to cease projecting the IR light toward the face in response to the eye(s) of the face being open. Accordingly, this may improve eye safety for the user.

In one example, pupil size may be used as a condition in adaptively controlling IR projection. Specifically, an amount of power in projecting the IR light toward the face may be reduced in response to an enlargement of the pupil of the eye(s) of the face. Again, this may improve eye safety for the user.

In one example, a distance of the face (or another ROI) may be used as a condition in adaptively controlling IR projection. Specifically, IR projection may be adaptively controlled based on a distance of the face/ROI from the one or more sensors (e.g., IR camera(s) and/or RGB camera). That is, as the distance of the face/ROI is inversely proportional to the size of the face/ROI in the image (i.e., larger size means the face/ROI is closer to the one or more sensors, and vice versa), an amount of power in projecting the IR light toward the face may be reduced in response to the distance of the face/ROI being lower than a distance threshold (e.g., reducing power in projecting the IR light when the face is relatively close). Accordingly, this may improve eye safety for the user.

In one example, environmental brightness (lux) may be used as a condition in adaptively controlling IR projection. Specifically, an amount of power in projecting the IR light may be reduced in response to the brightness level of an ambient light being lower than a brightness threshold.

In one example, environmental brightness (lux) may be used as a condition in adaptively controlling IR projection. Specifically, an amount of power in projecting the IR light may be reduced in response to the brightness level of an ambient light being lower than a brightness threshold.

In one example, a confidence level of a depth map may be used as a condition in adaptively controlling IR projection. Specifically, the IR projector may be enabled to project an IR light toward the ROI for each of one or more regions of a plurality of regions of a depth map having a respective confidence level lower than a confidence threshold.

In one example, an image texture of a ROI may be used as a condition in adaptively controlling IR projection. Specifically, the IR projector may be enabled to project an IR light toward the ROI for each of one or more regions of a plurality of regions of the ROI the respective amount of texture of which being lower than a texture threshold.

In one example, a power level of a battery that powers the IR projector may be used as a condition in adaptively controlling IR projection. Specifically, an amount of power in projecting the IR light may be reduced in response to the power level of the battery being lower than a power threshold.

Illustrative Implementations

Figure 3:
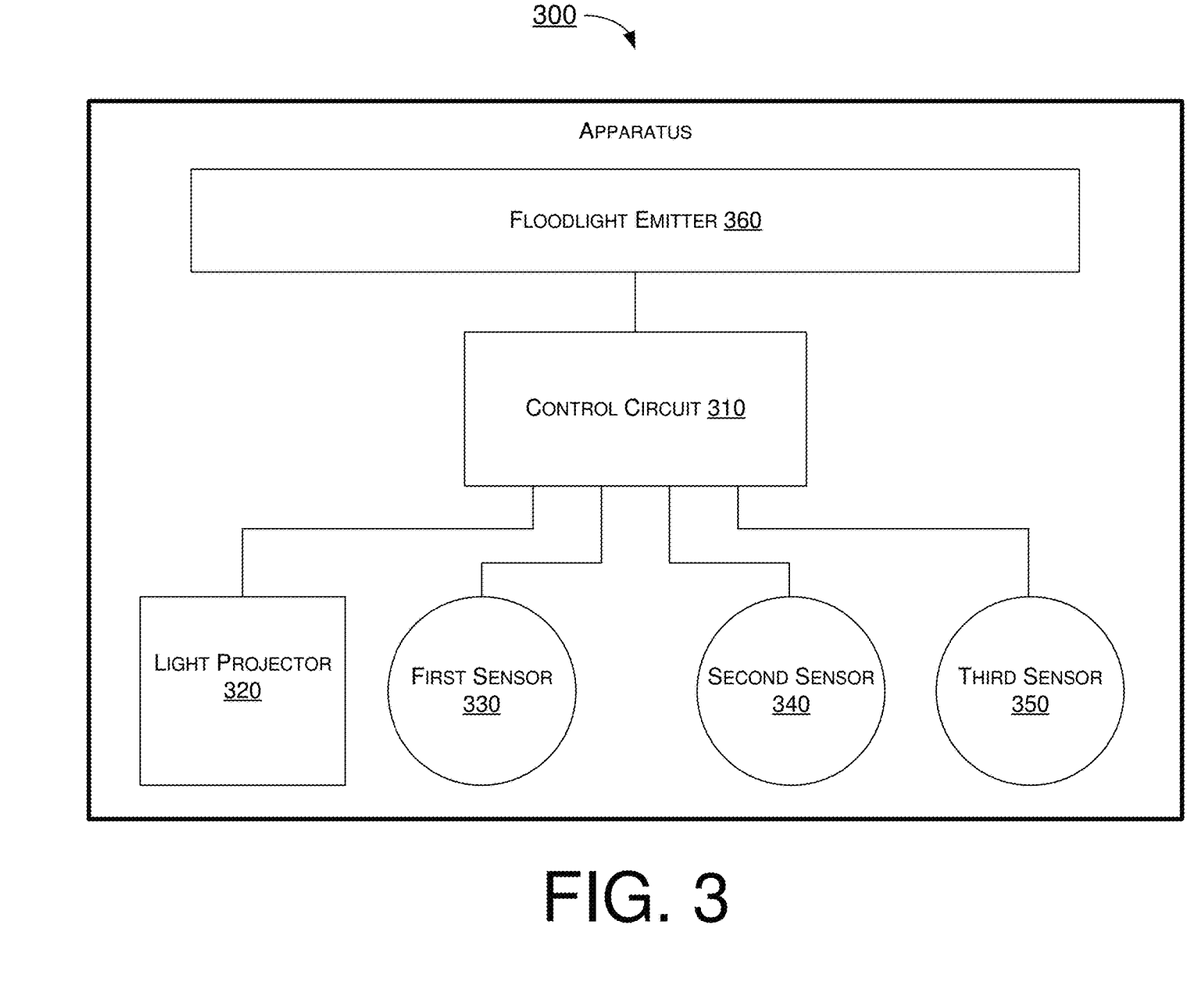
FIG. 3 is a diagram of an example apparatus in accordance with an implementation of the present disclosure.

FIG. 3 illustrates an example apparatus 300 in accordance with an implementation of the present disclosure. Apparatus 300 may perform various functions to implement procedures, schemes, techniques, processes and methods described herein pertaining to adaptive IR projection control for depth estimation in computer vision, including the various procedures, scenarios, schemes, solutions, concepts and techniques described above with respect to FIG. 1 and FIG. 2 as well as process 400 described below.

Apparatus 300 may be a part of an electronic apparatus, a portable or mobile apparatus, a wearable apparatus, a wireless communication apparatus or a computing apparatus. For instance, apparatus 300 may be implemented in a smartphone, a smartwatch, a personal digital assistant, a digital camera, or a computing equipment such as a tablet computer, a laptop computer or a notebook computer. Moreover, apparatus 300 may also be a part of a machine type apparatus, which may be an IoT or NB-IoT apparatus such as an immobile or a stationary apparatus, a home apparatus, a wire communication apparatus or a computing apparatus. For instance, apparatus 300 may be implemented in a smart thermostat, a smart fridge, a smart door lock, a wireless speaker or a home control center. Alternatively, apparatus 300 may be implemented in the form of a system-on-chip (SoC) or one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Apparatus 300 may include at least some of those components shown in FIG. 3 such as a control circuit 310, a light projector 320, a first sensor 330, a second sensor 340 and a floodlight emitter 360. Optionally, apparatus 300 may also include a third sensor 350. Apparatus 300 may further include one or more other components not pertinent to the proposed scheme of the present disclosure (e.g., internal power supply, memory device and/or user interface device), and, thus, such component(s) of apparatus 300 are neither shown in FIG. 3 nor described below in the interest of simplicity and brevity.

In one aspect, control circuit 310 may be implemented in the form of an electronic circuit comprising various electronic components. Alternatively, control circuit 310 may be implemented as part of or in the form of one or more single-core processors, one or more multi-core processors, one or more RISC processors, or one or more CISC processors. That is, even though a singular term "a processor" is used herein to refer to control circuit 310, control circuit 310 may include multiple processors in some implementations and a single processor in other implementations in accordance with the present disclosure. In another aspect, control circuit 310 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, control circuit 310 is a special-purpose machine specifically designed, arranged and configured to perform specific tasks pertaining to adaptive IR projection control for depth estimation in computer vision in accordance with various implementations of the present disclosure. In some implementations, control circuit 310 may include an electronic circuit with hardware components implementing one or more of the various proposed schemes in accordance with the present disclosure. Alternatively, other than hardware components, control circuit 310 may also utilize software codes and/or instructions in addition to hardware components to implement adaptive IR projection control for depth estimation in computer vision in accordance with various implementations of the present disclosure.

Under various proposed schemes in accordance with the present disclosure, during operation, control circuit 310 may receive data of an image based on sensing by one or more of first sensor 330, second sensor 340 and third sensor 350. Additionally, control circuit 310 may detect a region of interest (ROI) in the image. Moreover, control circuit 310 may adaptively control light projector 320 with respect to projecting light toward the ROI.

In some implementations, in receiving the data of the image, control circuit 310 may receive data of an IR image, a RGB image or a depth map.

In some implementations, in detecting the ROI in the image, control circuit 310 may detect a face in the image. In such cases, in adaptively controlling the light projector with respect to projecting the light toward the ROI, control circuit 310 may enable IR projector 320 to project an IR light toward the face during a first portion of a sensor readout time when the one or more image sensors read a portion of the image where the ROI is located. Moreover, control circuit 310 may disable IR projector 320 to cease projecting the IR light toward the face during a second portion of the sensor readout time when the one or more image sensors read another portion of the image where the ROI is not located. In some implementations, in enabling IR projector 320 to project the IR light toward the face during the first portion of the sensor readout time when the one or more image sensors read the portion of the image where the ROI is located, control circuit 310 may disable the light projector to cease projecting the IR light when the one or more image sensors read a portion of the image where an eye of the face is located.

In some implementations, in detecting the ROI in the image, control circuit 310 may detect a face in the image and detecting an eye on the face. In such cases, in adaptively controlling the light projector with respect to projecting the light toward the ROI, control circuit 310 may enable IR projector 320 to project an IR light toward the face responsive to the eye being closed or blinked. Additionally, control circuit 310 may disable IR projector 320 to cease projecting the IR light toward the face responsive to the eye being open.

In some implementations, in detecting the ROI in the image, control circuit 310 may detect a face in the image, detecting an eye on the face, and monitoring a pupil of the eye. In such cases, in adaptively controlling the light projector with respect to projecting the light toward the ROI, control circuit 310 may control IR projector 320 to reduce an amount of power in projecting an IR light toward the face responsive to an enlargement of the pupil.

In some implementations, in detecting the ROI in the image, control circuit 310 may detect a face in the image and determining a distance of the face from the one or more image sensors based on a size of the face in the image. In such cases, in adaptively controlling the light projector with respect to projecting the light toward the ROI, control circuit 310 may control IR projector 320 to reduce an amount of power in projecting an IR light toward the face responsive to the distance of the face being lower than a distance threshold.

In some implementations, control circuit 310 may detect a brightness level of an ambient light (e.g., based on data received from any of first sensor 330, second sensor 340 and third sensor 350, or by receiving a sensing date from a light sensor (not shown)). Moreover, in adaptively controlling the light projector with respect to projecting the light toward the ROI, control circuit 310 may control IR projector 320 to reduce an amount of power in projecting an IR light responsive to the brightness level of the ambient light being lower than a brightness threshold.

In some implementations, in receiving the data of the image, control circuit 310 may receive data of a depth map of the ROI. In such cases, in adaptively controlling the light projector with respect to projecting the light toward the ROI, control circuit 310 may determine a respective confidence level for each of a plurality of regions of the depth map. Furthermore, control circuit 310 may enable IR projector to project 320 an IR light toward the ROI for each of one or more regions of the plurality of regions of the depth map the respective confidence level of which being lower than a confidence threshold.

In some implementations, in adaptively controlling the light projector with respect to projecting the light toward the ROI, control circuit 310 may perform some operations. For instance, control circuit 310 may determine a respective amount of texture for each of a plurality of regions of the ROI in the image. Moreover, control circuit 310 may enable IR projector 320 to project an IR light toward the ROI for each of one or more regions of the plurality of regions of the ROI the respective amount of texture of which being lower than a texture threshold.

In some implementations, in adaptively controlling the light projector with respect to projecting the light toward the ROI, control circuit 310 may perform some other operations. For instance, control circuit 310 may detect a power level of a battery that powers the light projector. Additionally, control circuit 310 may control IR projector 320 to reduce an amount of power in projecting an IR light toward the ROI responsive to the power level of the battery being lower than a power threshold.

Illustrative Processes

Figure 4:
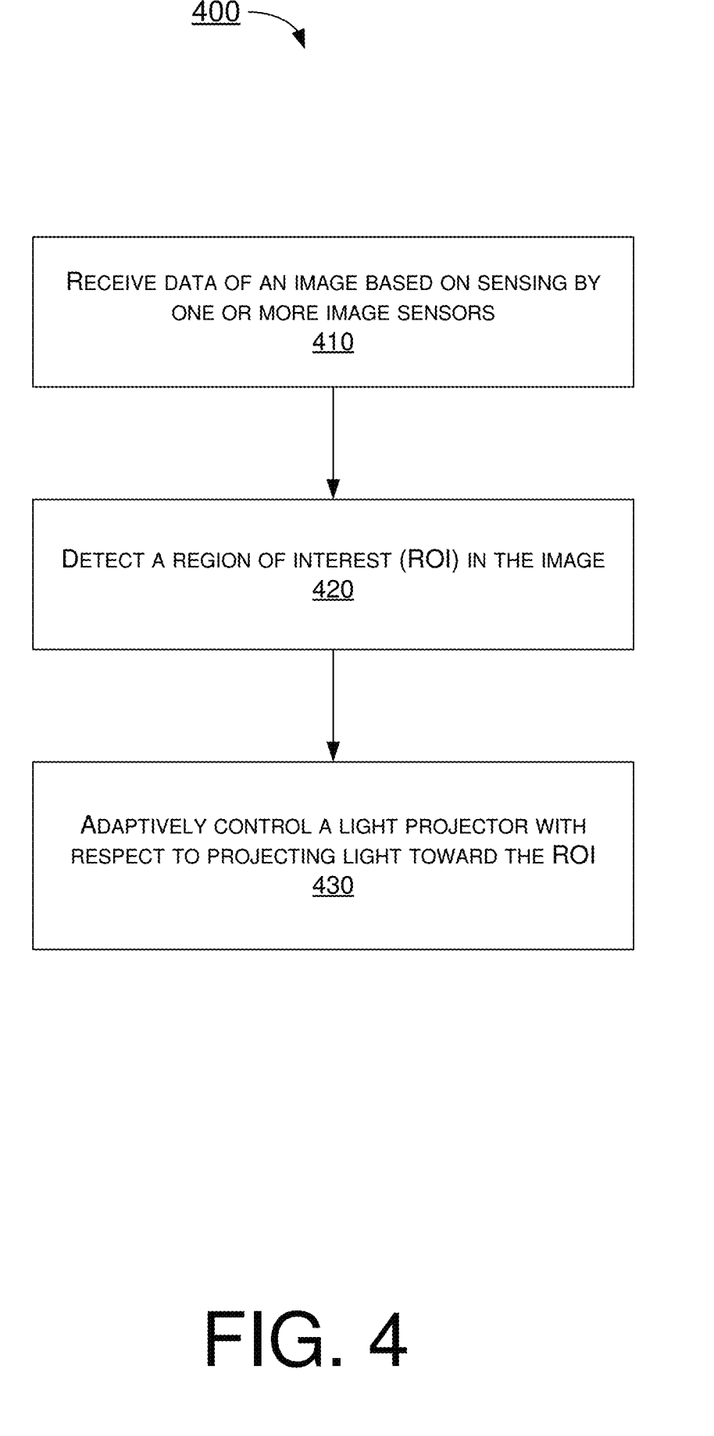
FIG. 4 is a flowchart of an example process in accordance with an implementation of the present disclosure.

FIG. 4 illustrates an example process 400 in accordance with an implementation of the present disclosure. Process 400 may be an example implementation of the various procedures, scenarios, schemes, solutions, concepts and techniques, or a combination thereof, whether partially or completely, with respect to adaptive IR projection control for depth estimation in computer vision in accordance with the present disclosure. Process 400 may represent an aspect of implementation of features of apparatus 300. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Furthermore, one or more of the blocks of process 400 may be repeated one or more times. Process 400 may be implemented by apparatus 300 or any variation thereof. Solely for illustrative purposes and without limitation, process 400 is described below in the context of apparatus 300. Process 400 may begin at block 410.

At 410, process 400 may involve control circuit 310 receiving data of an image based on sensing by one or more of first sensor 330, second sensor 340 and third sensor 350. Process 400 may proceed from 410 to 420.

At 420, process 400 may involve control circuit 310 detecting a region of interest (ROI) in the image. Process 400 may proceed from 420 to 430.

At 430, process 400 may involve control circuit 310 adaptively controlling light projector 320 with respect to projecting light toward the ROI.

In some implementations, in receiving the data of the image, process 400 may involve control circuit 310 receiving data of an IR image, a RGB image or a depth map.

In some implementations, in detecting the ROI in the image, process 400 may involve control circuit 310 detecting a face in the image. In such cases, in adaptively controlling the light projector with respect to projecting the light toward the ROI, process 400 may involve control circuit 310 enabling IR projector 320 to project an IR light toward the face during a first portion of a sensor readout time when the one or more image sensors read a portion of the image where the ROI is located. Moreover, process 400 may involve control circuit 310 disabling IR projector 320 to cease projecting the IR light toward the face during a second portion of the sensor readout time when the one or more image sensors read another portion of the image where the ROI is not located. In some implementations, in enabling IR projector 320 to project the IR light toward the face during the first portion of the sensor readout time when the one or more image sensors read the portion of the image where the ROI is located, process 400 may involve control circuit 310 disabling the light projector to cease projecting the IR light when the one or more image sensors read a portion of the image where an eye of the face is located.

In some implementations, in detecting the ROI in the image, process 400 may involve control circuit 310 detecting a face in the image and detecting an eye on the face. In such cases, in adaptively controlling the light projector with respect to projecting the light toward the ROI, process 400 may involve control circuit 310 enabling IR projector 320 to project an IR light toward the face responsive to the eye being closed or blinked. Additionally, process 400 may involve control circuit 310 disabling IR projector 320 to cease projecting the IR light toward the face responsive to the eye being open.

In some implementations, in detecting the ROI in the image, process 400 may involve control circuit 310 detecting a face in the image, detecting an eye on the face, and monitoring a pupil of the eye. In such cases, in adaptively controlling the light projector with respect to projecting the light toward the ROI, process 400 may involve control circuit 310 controlling IR projector 320 to reduce an amount of power in projecting an IR light toward the face responsive to an enlargement of the pupil.

In some implementations, in detecting the ROI in the image, process 400 may involve control circuit 310 detecting a face in the image and determining a distance of the face from the one or more image sensors based on a size of the face in the image. In such cases, in adaptively controlling the light projector with respect to projecting the light toward the ROI, process 400 may involve control circuit 310 controlling IR projector 320 to reduce an amount of power in projecting an IR light toward the face responsive to the distance of the face being lower than a distance threshold.

In some implementations, process 400 may involve control circuit 310 detecting a brightness level of an ambient light. Moreover, in adaptively controlling the light projector with respect to projecting the light toward the ROI, process 400 may involve control circuit 310 controlling IR projector 320 to reduce an amount of power in projecting an IR light responsive to the brightness level of the ambient light being lower than a brightness threshold.

In some implementations, in receiving the data of the image, process 400 may involve control circuit 310 receiving data of a depth map of the ROI. In such cases, in adaptively controlling the light projector with respect to projecting the light toward the ROI, process 400 may involve control circuit 310 determining a respective confidence level for each of a plurality of regions of the depth map. Furthermore, process 400 may involve control circuit 310 enabling IR projector to project 320 an IR light toward the ROI for each of one or more regions of the plurality of regions of the depth map the respective confidence level of which being lower than a confidence threshold.

In some implementations, in adaptively controlling the light projector with respect to projecting the light toward the ROI, process 400 may involve control circuit 310 performing some operations. For instance, process 400 may involve control circuit 310 determining a respective amount of texture for each of a plurality of regions of the ROI in the image. Moreover, process 400 may involve control circuit 310 enabling IR projector 320 to project an IR light toward the ROI for each of one or more regions of the plurality of regions of the ROI the respective amount of texture of which being lower than a texture threshold.

In some implementations, in adaptively controlling the light projector with respect to projecting the light toward the ROI, process 400 may involve control circuit 310 performing some other operations. For instance, process 400 may involve control circuit 310 detecting a power level of a battery that powers the light projector. Additionally, process 400 may involve control circuit 310 controlling IR projector 320 to reduce an amount of power in projecting an IR light toward the ROI responsive to the power level of the battery being lower than a power threshold.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving data of an image based on sensing by one or more image sensors;
detecting a region of interest (ROI) in the image; and
adaptively controlling a light projector with respect to projecting light toward the ROI,
wherein the detecting of the ROI in the image comprises:
detecting a face in the image; and
detecting an eye on the face, and
wherein the adaptively controlling of the light projector with respect to projecting the light toward the ROI comprises:
enabling an infrared (IR) projector to project an IR light toward the face responsive to the eye being closed or blinked; and
disabling the IR projector to cease projecting the IR light toward the face responsive to the eye being open.

2. The method of claim 1, wherein the receiving of the data of the image comprises receiving data of an IR image, a red-green-blue (RGB) image or a depth map.

3. An apparatus, comprising:
a processor or control circuit which, during operation, performs operations comprising:
receiving data of an image based on sensing by one or more image sensors;
detecting a region of interest (ROI) in the image; and
adaptively controlling a light projector with respect to projecting light toward the ROI,
wherein, in detecting the ROI in the image, the processor or control circuit performs operations comprising:
detecting a face in the image; and
detecting an eye on the face, and
wherein, in adaptively controlling the light projector with respect to projecting the light toward the ROI, the processor or control circuit performs operations comprising:
enabling an infrared (IR) projector to project an IR light toward the face responsive to the eye being closed or blinked;
controlling the IR projector to reduce an amount of power in projecting the IR light toward the face responsive to an enlargement of a pupil of the eye; and
disabling the IR projector to cease projecting the IR light toward the face responsive to the eye being open.

4. The apparatus of claim 3, wherein the receiving of the data of the image comprises receiving data of an IR image, a red-green-blue (RGB) image or a depth map.

5. A method, comprising:
receiving data of an image based on sensing by one or more image sensors;
detecting a region of interest (ROI) in the image; and
adaptively controlling a light projector with respect to projecting light toward the ROI based on a predefined region within the ROI by:
enabling the light projector when the one or more image sensors are reading a portion of the image where the ROI is located responsive to a first action being performed in the predefined region within the ROI, and
disabling the light projector when the one or more image sensors are reading the portion of the image where the ROI is located responsive to a second action different from the first action being performed in the predefined region within the ROI,
wherein the detecting of the ROI in the image comprises detecting a face in the image,
wherein the predefined region within the ROI comprises an eye,
wherein the first action performed in the predefined region within the ROI comprises the eye being closed, and
wherein the second action performed in the predefined region within the ROI comprises the eye being open.

6. The method of claim 5, wherein the receiving of the data of the image comprises receiving data of an IR image, a red-green-blue (RGB) image or a depth map.

* * * * *